United States Patent
Ohmori et al.

(10) Patent No.: US 6,627,336 B1
(45) Date of Patent: Sep. 30, 2003

(54) TITANIUM OXIDE SOL, THIN FILM, AND PROCESSES FOR PRODUCING THESE

(75) Inventors: Masahiro Ohmori, Chiba (JP); Hidenori Nakamura, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/700,307

(22) PCT Filed: May 14, 1999

(86) PCT No.: PCT/JP99/02507

§ 371 (c)(1),
(2), (4) Date: Feb. 16, 2001

(87) PCT Pub. No.: WO99/58451

PCT Pub. Date: Nov. 18, 1999

Related U.S. Application Data

(60) Provisional application No. 60/094,491, filed on Jul. 29, 1998.

(30) Foreign Application Priority Data

May 14, 1998 (JP) ............................. 10-132195
Apr. 16, 1999 (JP) ............................. 11-109171

(51) Int. Cl.[7] ............................. B32B 19/00
(52) U.S. Cl. .................. 428/702; 106/287.19; 106/436; 106/447; 106/449; 427/168; 502/350; 516/90
(58) Field of Search ....................... 516/90; 106/287.19, 106/436, 447, 449; 502/350; 427/168; 428/702

(56) References Cited

U.S. PATENT DOCUMENTS

| | | | | |
|---|---|---|---|---|
| 4,448,609 A | * | 5/1984 | Tear et al. ................. | 516/90 X |
| 5,059,248 A | * | 10/1991 | Signorino et al. ......... | 516/90 X |
| 5,698,205 A | * | 12/1997 | Brückner et al. .......... | 516/90 X |
| 5,919,726 A | * | 7/1999 | Hatano et al. ............. | 502/350 X |
| 5,942,281 A | * | 8/1999 | Guez et al. ............... | 106/449 X |
| 6,037,289 A | * | 3/2000 | Chopin et al. ....... | 106/287.19 X |
| 6,228,480 B1 | * | 5/2001 | Kimura et al. ....... | 106/287.19 X |
| 6,337,301 B1 | * | 1/2002 | Ohmori et al. ............. | 502/350 |
| 6,340,711 B1 | * | 1/2002 | Ohmori et al. ........... | 516/90 X |
| 6,387,844 B1 | * | 5/2002 | Fujishima et al. .......... | 502/350 |

FOREIGN PATENT DOCUMENTS

| | | |
|---|---|---|
| JP | 61-283629 | 12/1986 |
| JP | 02-014820 | 1/1990 |
| JP | 02-196029 | 8/1990 |
| JP | 07-002522 | 1/1995 |
| JP | 07-089722 | 4/1995 |
| JP | 09-278443 | 10/1997 |
| JP | 11-100526 | 4/1999 |

OTHER PUBLICATIONS

Patent Abstracts of Japan, abstracting JP 11–100526 of Apr. 13, 1999.
Patent Abstracts of Japan, abstracting JP 07–089722 of Apr. 4, 1995.
Patent Abstracts of Japan, abstracting JP 09–278443 of Oct. 28, 1997.
Patent Abstracts of Japan, abstracting JP 02–196029 of Aug. 2, 1990.
Patent Abstracts of Japan, abstracting JP 61–283629 of Dec. 13, 1986.
Patent Abstracts of Japan, abstracting JP 02–014820 of Jan. 18, 1990.
Patent Abstracts of Japan, abstracting JP 07–002522 of Jan. 6, 1995.

* cited by examiner

Primary Examiner—Richard D. Lovering
(74) Attorney, Agent, or Firm—Sughrue Mion, PLLC

(57) ABSTRACT

An aqueous dispersion of titanium oxide particles comprising chloride ion, and a Brønsted base other than chloride ion, preferably at least one kind of ion selected from nitrate ion and phosphate ion. Preferably the titanium oxide particles are predominantly comprised of brookite titanium oxide particles. The aqueous titanium oxide dispersion is prepared by hydrolyzed titanium tetrachloride in the presence of at least one kind of a Brønsted acid. A thin film formed from this aqueous titanium oxide dispersion exhibits good photocatalytic activity, transparency and adhesion to a base material.

35 Claims, 1 Drawing Sheet

TITANIUM OXIDE SOL, THIN FILM, AND PROCESSES FOR PRODUCING THESE

This application is a 371 of PCT/JP 99/02507 filed May 14, 1999, which claims benefit of U.S. Provisional Application No. 60/094,491 filed Jul. 29, 1998.

TECHNICAL FIELD

This invention relates to an aqueous dispersion of titanium oxide particles, a titanium oxide thin film formed on a surface of a base material such as ceramic or plastic from the aqueous titanium oxide dispersion, a process for producing the aqueous dispersion of titanium oxide particles, and a process for producing titanium oxide particles from the aqueous titanium oxide dispersion.

The titanium oxide thin film is transparent, has an excellent photo-catalytic action and exhibits good adhesion to a base material.

BACKGROUND ART

With respect to titanium dioxide (hereinafter referred to as "titanium oxide"), it is known that three crystal phases of anatase, brookite and rutile exist. In the case of a vapor phase production process wherein titanium oxide is prepared by the premixed combustion of titanium tetrachloride and oxygen or the like, anatase titanium oxide is produced at the lowest temperature and this oxide is stable. When the anatase titanium oxide is heat treated and burnt, brookite titanium oxide is obtained at a temperature in the range from 816° C. to 1,040° C. and rutile titanium oxide is obtained in a temperature range higher than this range (see, *Rikagaku Jiten* (*Dictionary of Physicochemistry*), 3rd ed., pp. 514–515).

With respect to a liquid phase production process, Kouemon Funaki has, reported in detail on the crystal phase of titanium oxide produced by hydrolysis of an aqueous titanium tetrachloride solution (see, *Kogyo Kagaku* [*Industrial Chemistry*], Vol. 59, No. 11, p. 1295(1956)). This report states that rutile titanium oxide is produced predominantly from a high concentration solution and anatase titanium oxide is produced predominantly from a low concentration solution, and further that finely divided particles of brookite titanium oxide could not be produced in a liquid phase. The starting raw material is titanium tetrachloride and therefore the resulting titanium oxide inevitably contains chlorine ion.

As seen from these reports, it has heretofore been difficult to stably prepare brookite titanium oxide by a liquid phase process. When titanium oxide obtained by a vapor phase process is heat-treated at a high temperature, the titanium oxide changes into brookite titanium oxide as described above, however, the particles grow due to the heat treatment, and accordingly, it has heretofore been difficult to obtain finely divided titanium oxide particles with brookite crystal form.

On the other hand, a sol, i.e., an aqueous dispersion of titanium oxide particles is generally produced by dispersing crystalline or amorphous titanium oxide particles in a dispersion medium, or incorporating a precursor of titanium oxide such as a titanium alkoxide, titanium sulfate or titanium tetrachloride in a dispersion medium, and then neutralizing or hydrolyzing the dispersion or mixture to form a sol.

The aqueous titanium oxide dispersion is used for producing a titanium oxide powder or forming a titanium oxide thin film on a surface of glass, plastic or other materials by coating the aqueous dispersion onto the surface.

The titanium oxide is a photo-semiconductor and known to exhibit transparency and improved photo-catalytic function when the particle size is small. The photo-catalytic function of titanium oxide is being aggressively investigated and studied in recent years. This photo-catalyst is used for stain-proofing by removing harmful substances, deodorization of malodorous gas such as ammonia, or sterilization of microbes, and according to the purpose of use, the titanium oxide is formed into various shapes such as bulk particles, thin film and a sol. In the case of obtaining transparency in addition to the photo-catalytic function, the titanium oxide is most often formed into a thin film. To this purpose, the titanium oxide as a film forming material is used in the form of a sol, i.e., an aqueous dispersion.

As for the photo-catalytic capacity of titanium oxide, it is known that the anatase type surpasses the rutile type. This is ascribable to the difference in the energy gap between the two types. The rutile type has an energy gap of 3.02 eV and the anatase type has 3.23 eV, thus, the difference between the two types of crystal forms is about 0.2 eV (see, *Ceramics* 31, No. 10, p. 817 (1996). Due to this difference in energy gap, anatase titanium oxide having a high energy gap is conventionally used as a photo-semiconductor. However, heretofore no case is known where brookite titanium oxide is extracted as a single substance. Moreover, it has been difficult to produce finely divided brookite titanium oxide particles having a high specific surface area and capable of use as a photo-semiconductor (photo-catalyst) because the particles are undesirably sintered due to the production process employing a high temperature. Thus, the capacity of the brookite titanium oxide as a photo-catalyst is quite unknown.

In recent years, there has been proposed a process of coating a sol of finely divided titanium oxide particles on a lighting equipment such as glass tube or cover of a fluorescent lamp to form a thin film, and using the thin film for decomposing by the photo-catalytic action thereof an organic material such as lamp black adhering to the glass tube or cover, thereby preventing pollution of the glass tube or cover. However, when a thin file is formed from the aqueous titanium oxide dispersion obtained by above-described process, a thin film having high transparency is difficult to obtain. In particular, use of a brookite titanium oxide thin film as a photo-catalyst for lighting equipments or other articles is heretofore not known.

In recent years, there has proposed a process of coating a sol of finely divided titanium oxide particles on a lighting equipment such as glass tube or cover of a fluorecent lamp to form a thin film, and using the thin film for decomposing by the photo-catalytic action thereof an organic material such as lamp black adhering to the glass tube or cover, thereby preventing pollution of the glass tube or cover. However, when a thin film is formed the aqueous titanium oxide dispersion obtained by above-described process, a thin film having high transparency is difficult to obtain. In particular, use of a brookite titanium oxide thin film as a photo-catalyst for lighting equipments or other articles is heretofore not known.

In the case of forming a titanium oxide thin film on a base material made of glass, plastic or other substances and using the thin film as a photo-catalyst, the thin film is required to have a high photo-catalytic activity. The photo-catalytic action is a reaction occurring on the surface of a particle and, in order to attain a high photo-catalytic activity, the particle is preferably a finely divided particle having a high specific surface area. When a thin film is formed on lighting equipments or other articles, the thin film must be transparent and thus, similarly to the photo-catalytic activity, finely divided particles are preferable so as to attain good transparency, moreover, a dispersion of primary particles is preferred. Conventionally, these requirements have been dealt with mainly by using finely divided anatase titanium oxide particles.

In the case of forming a titanium oxide thin film on a base material, good adhesion must be attained between the thin film and the base material, otherwise, the thin film is readily stripped off.

According to the conventional production process comprising hydrolyzing titanium tetrachloride, it has been very difficult to produce an aqueous titanium oxide dispersion comprising finely divided particles having a very small particle size, a high crystallinity and, when formed into a thin film, exhibits good transparency.

The titanium oxide in a sol produced by the hydrolysis of a titanium alkoxide compound may have good powder properties such that the particle size is very small, however, the titanium alkoxide compound is very expensive as compared with titanium tetrachloride.

DISCLOSURE OF THE INVENTION

In view of the foregoing prior art, an object of the present invention is to provide a sol, i.e. an aqueous dispersion of finely divided titanium oxide particles characterized in that, when the sol is coated on a surface of a base material of various types to form a titanium oxide thin film on the base material surface, the thin film exhibits good photo-catalytic function, high transparency and sufficiently high adhesion between the thin film and the base material. Another object is to provide a thin film formed from the aqueous titanium oxide dispersion A further object is to provide a process for producing finely divided titanium oxide particles from the aqueous titanium oxide dispersion.

As a result of extensive investigations on a titanium oxide thin film formed from an aqueous titanium oxide dispersion, the present inventors have found that, by allowing a Brønsted base other than chlorine ion, preferably either one or both of nitrate ion and phosphate ion to exist together with chloride ion in the aqueous titanium oxide dispersion good thin film properties can be obtained, for example, the transparency is good and the adhesion between the base material and the thin film is sufficiently high, and further that the titanium oxide predominantly comprised of brookite titanium oxide has a photo-catalytic capacity equal to or higher than the photo-catalytic capacity of anatase titanium oxide. The present invention has been accomplished based on these finding.

Thus, in one aspect of the present invention, there is provided an aqueous dispersion of finely divided titanium oxide particles comprising chloride ion and at least one kind of Brønsted base selected from the group consisting of pyrophosphate ion, metaphosphate ion, polyphosphate ion, methanesulfonate ion, ethanesulfonate ion, dodecylbenzenesulfonate ion and propanesulfonate ion. The term "Brønsted base" herein used, we mean a proton acceptor in Brønsted acid-base concept.

In another aspect of the present invention, there is provided a titanium oxide thin film formed on a surface of a base material from the above-mentioned aqueous dispersion of finely divided titanium oxide particles.

In still another aspect of the present invention, there is provided an article made by coating a surface of a base material with the above-mentioned aqueous dispersion of finely divided titanium oxide particles.

In a further aspect of the present invention, there is provided a process for producing an aqueous dispersion of finely divided titanium oxide particles, especially a dispersion of finely divided titanium oxide particles predominantly comprised of finely divided brookite titanium oxide particles, which dispersion comprises chloride ion and a Brønsted base other than chloride ion, characterized in that titanium tetrachloride is hydrolyzed in the presence of at least one kind of Brønsted acid selected from the group consisting of nitrate ion, phosphate ion, pyrophosphate ion, metaphosphate ion, polyphosphate ion, methanesulfonate ion, ethanesulfonate ion, dodecylbenzene-sulfonate ion and propanesulfonate ion; and a process for producing finely divided titanium oxide particles characterized by obtaining the titanium oxide particles from the aqueous titanium oxide dispersion prepared by the above-mentioned process.

In a further aspect of the present invention, there is provided a process for producing an aqueous dispersion of finely divided titanium oxide particles predominantly comprised of finely divided brookite titanium oxide particles, which dispersion comprises chloride ion and either one or both of nitrate ion and phosphate ion, characterized in that titanium tetrachloride is incorporated in hot water maintained at a temperature of 75° C. to 100° C., and then, the titanium tetrachloride is hydrolyzed in the presence of either one or both of nitrate ion and phosphate ion at a temperature in the range of 75° C. to the boiling point of an aqueous reaction solution; and a process for producing titanium oxide particles, characterized by obtaining finely divided titanium oxide particles predominantly comprised of finely divided brookite titanium oxide particles, from the aqueous dispersion of brookite titanium oxide particles prepared by the above-mentioned process.

BEST MODE FOR CARRYING OUT THE INVENTION

Figure 1:
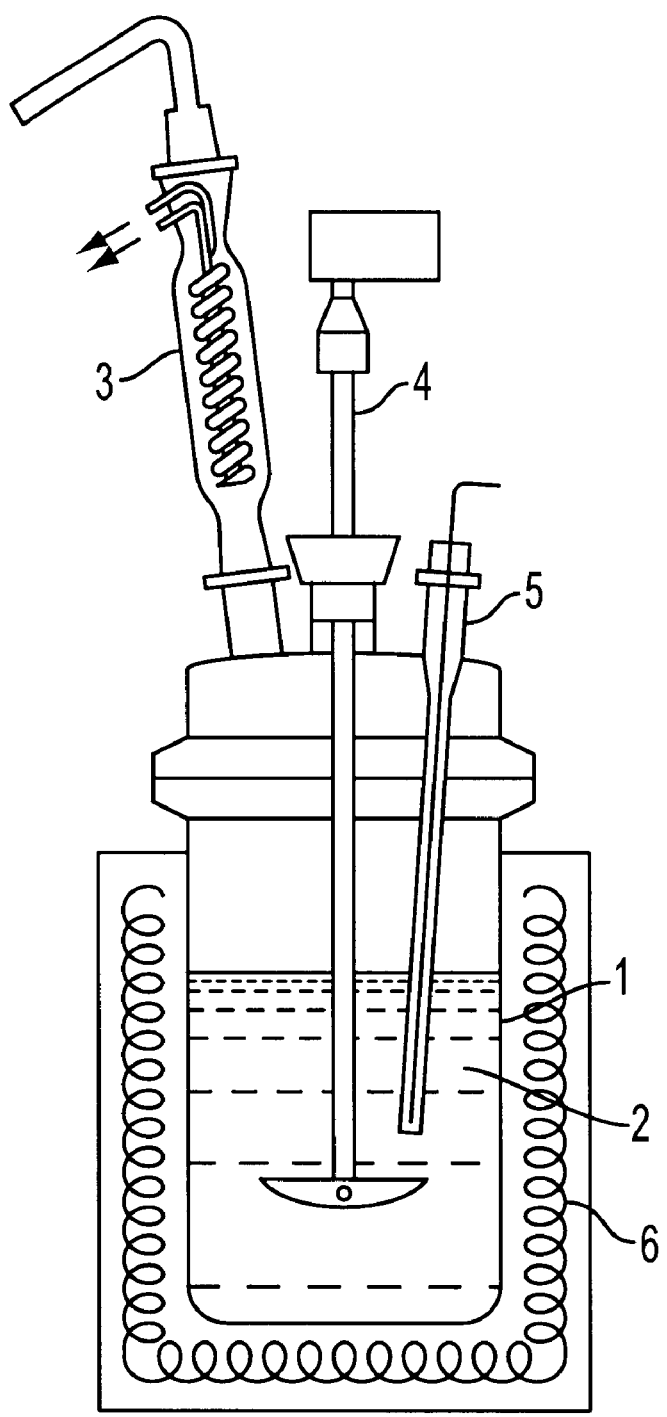
FIG. 1 is a schematic cross-sectional view showing one preferable example of a reaction vessel used for the production of an aqueous titanium oxide dispersion of the present invention.

The aqueous titanium oxide dispersion of the present invention comprises chloride ion and at least one Brønsted base other than chloride ion. A thin film formed from the aqueous titanium oxide dispersion has not only excellent photo-catalytic function but also high adhesion to the base material and improved transparency.

The Brønsted base contained in the aqueous titanium oxide dispersion of the present invention is preferably selected from nitrate ion, phosphate ion, pyrophosphate ion, metaphosphate ion, polyphosphate ion, acetate ion and organic acid ions. These Brønsted bases may be contained either alone or as a combination of at least two thereof. As specific examples of the organic acid ions, there can be mentioned methanesulfonic acid, ethanesulfonic acid, dodecylbenzenesulfonic acid and propanesulfonic acid. The amount of the Brønsted base contained in the aqueous titanium oxide dispersion of the present invention means not the amount of the Brønsted base which is present in equilibrium state in the aqueous dispersion, but the absolute amount of the total ions which are present in the aqueous dispersion. The content of chloride ion and the Brønsted base other than chloride ion is preferably in the range of 50 ppm to 10,000 ppm, more preferably 100 ppm to 4,000 ppm, as the total anion content in the titanium oxide sol.

The dispersion medium of the aqueous titanium oxide dispersion is usually water or a mixture of water and an organic solvent. In the case of preparing the aqueous titanium oxide dispersion by hydrolyzing titanium tetrachloride, hydrogen chloride is generated during the hydrolysis reaction, and dissociated into chloride ion and hydrogen ion in the resulting aqueous dispersion. This hydrogen chloride generally escapes from the system in many cases during the hydrolysis reaction under heating. It is considered that the presence of hydrogen chloride in the aqueous dispersion incurs various troubles when a titanium oxide powder is prepared or a titanium oxide thin film is formed from the aqueous dispersion. Accordingly, if a certain amount of hydrogen chloride remains in the sol after completion of the hydrolysis reaction, the aqueous dispersion is usually subjected to a dechlorination treatment to reduce the hydrogen chloride content in the aqueous dispersion as much as possible. However, effects of this chloride ion in the aqueous dispersion on the properties of the titanium oxide thin film have heretofore been not studied and no attempt has been made for controlling the chloride ion in the aqueous dispersion from this aspect.

The present inventors have previously found that when chloride ion is contained in the aqueous dispersion, a titanium oxide thin film formed from the aqueous dispersion has a high photo-catalytic activity and excellent adhesion to a base material. Thereafter, studies have been continued to have found that when chloride ion, and at least one Brønsted base other than chloride ion, such as nitrate ion or phosphate ion, are present together, the thin film formed exhibits more improved transparency and adhesion. The present invention has been accomplished based on these findings. The reason for which the improved results are obtained is not clear, but it is presumed that a condensation reaction occurs due to the acid catalyst effect of a co-existing Brønsted acid such as nitric acid or phosphoric acid, and the film-forming property and adhesion of the thin film are enhanced.

It may be sufficient that chloride ion and at least one kind of an ion selected from Brønsted bases other than chloride ion (said ion is hereinafter referred to as "chloride ion and the like" when appropriate) are present together in the aqueous titanium oxide dispersion, however, in order to increase the adhesion between the titanium oxide thin film formed on a base material and the base material, chloride ion and the like are preferably contained in the total amount of at least 50 ppm. In particular, in the case where the thin film is calcined, the adhesion is improved when chloride ion and the like are contained in the total amount of at least 50 ppm. If the total amount of chloride ion and the like increases in the aqueous dispersion and exceeds 10,000 ppm, the transparency of the thin film is deteriorated. The total amount is particularly preferably in the range of from 100 ppm to 4,000 ppm.

The ratio of Brønsted base other than chloride ion to chloride ion is not particularly limited, and the total amount of chloride ion and Brønsted base other than chloride ion may be selected over a wide range, for example, from 0.1 mol to 200 mols per mol of chloride ion.

It is surprising that brookite titanium oxide can be produced by maintaining the total amount of chloride ion and Brønsted base other than chloride ion in the above-mentioned range. Although the reason is not clear, the aqueous titanium oxide dispersion containing brookite crystal exhibits high photo-catalytic activity and results in a thin film having good transparency as compared with an aqueous titanium oxide dispersion containing anatase crystal or rutile crystal alone or an aqueous titanium oxide dispersion containing both of anatase crystal and rutile crystal. The content of brookite crystal in the aqueous dispersion is not particularly limited but is preferably in the range of 10% to 100% by weight, and more preferably 50% to 100% by weight.

The action of chloride ion and the like is not clearly elucidated but it is presumed that electrical repulsion among titanium oxide particles in the aqueous titanium oxide dispersion increases to bring about good dispersion of particles, as a result, the above-described good effects on the transparency and peel strength can be obtained.

As the titanium oxide particles in the aqueous titanium oxide dispersion are smaller, the photo-catalytic activity and transparency of the titanium oxide thin film are more improved. However, excessively small titanium oxide particles are difficult to produce. Accordingly, the titanium particles in the aqueous dispersion preferably have an average primary particle diameter in the range of 0.01 $\mu$m to 0.1 $\mu$m.

In order to further increase the photo-catalytic function and transparency of the thin film formed from the aqueous titanium oxide dispersion is preferably an aqueous dispersion such that titanium oxide particles predominantly comprised of brookite titanium oxide particles and having an average particle diameter in the range of from 0.01 $\mu$m to 0.1 $\mu$m and a specific surface area of at least 20 m$^2$/g are dispersed in water or a mixture of water and an organic solvent.

As a process for producing brookite titanium oxide particles, heretofore known is only a process of heat-treating anatase titanium oxide particles as described above. If formation of a thin film is attempted using the brookite titanium oxide particles obtained by the heat treatment, a thin film cannot be successfully formed because the particle size is inevitably greatly increased due to sintering during the heat treatment. Accordingly, this brookite titanium oxide particles have not been used at all for forming a thin film.

In the aqueous titanium oxide dispersion of the present invention, if the concentration of titanium oxide particles is too high, the particles coagulates to render the aqueous dispersion unstable. On the other hand, if the concentration of titanium oxide particles is too low, there arise problems, for example, the process of coating the aqueous dispersion takes a long period of time for the thin film formation. Accordingly, the concentration (content) of titanium oxide particles in the aqueous titanium oxide dispersion is suitably in the range of from 0.05 mol/liter to 10 mol/liter.

The aqueous titanium oxide dispersion of the present invention may be processed in a usual manner, for example, through filtering, water washing and drying, to obtain titanium oxide particles. The titanium oxide particles preferably have an average primary particle diameter in the range of from 0.01 $\mu$m to 0.1 $\mu$m. The titanium oxide particles obtained from an aqueous titanium oxide dispersion predominantly comprised of brookite titanium oxide particles preferably have an average particle in the range of from 0.01 $\mu$m to 0.1 $\mu$m and a specific surface area of at least 20 m$^2$/g.

In the case of using the aqueous titanium oxide dispersion for forming a thin film, a small amount, for example, from about 10 ppm to about 10,000 ppm of a water-soluble polymer may be added so as to increase the thin film forming property of the aqueous dispersion. Suitable examples of the water-soluble polymer include polyvinyl alcohol, methyl cellulose, ethyl cellulose, CMC and starch.

The aqueous titanium oxide dispersion of the present invention may be coated on a base material to form a titanium oxide thin film on the base material surface. As the base material, various materials and shaped articles may be used and, for example, ceramics, metals, plastics, wood, paper and the like may be used almost without any limitation. Also, the base material may be previously coated. Furthermore, the base material may comprise alumina, zirconia or the like which can work out to a catalyst support, and after allowing the titanium oxide thin film catalyst to be supported thereon, the base material may be used as a catalyst. When glass, plastic cover or the like of lighting equipments such as fluorescent lamp is used as a base material and a titanium oxide thin film is formed thereon, the thin film is transparent and has a photo-catalytic activity and accordingly, the thin film can decompose an organic material such as lamp black without shielding the light and thus, is effective for preventing pollution of the glass or cover. When a titanium oxide thin film is formed on an architectural glass or wall material, the thin film can similarly prevent pollution. Accordingly, the titanium oxide thin film may be formed on the window material or wall material of a tall building and this can dispense with cleaning operation, in turn, the cost for managing the building can be curtailed.

The aqueous titanium oxide dispersion may be coated on a base material by a process of dipping the base material in the aqueous dispersion, a process of spraying the aqueous dispersion on the base material, or a process of coating the base material with the aqueous dispersion by using a brush. The amount of the aqueous dispersion applied for coating is preferably from 0.01 mm to 0.2 mm expressed in terms of thickness of the liquid coating. After the coating, the base material coated with the aqueous dispersion is dried to remove the moisture content and thus, a thin film is obtained. This thin film can be used as it is as a catalyst or for others.

In the case where the base material is made of heat-resistant substance, such as metal, ceramic or glass, the titanium oxide thin film formed may be calcined. By the calcination, the thin film is more tightly bonded to the base material and the hardness of the thin film is enhanced. The calcination temperature is preferably at least 200° C. The upper limit of the calcination temperature is not particularly limited and may be selected according to the degree of heat resistance of the base material. However, even if an excessively high temperature is employed, hardness of the thin film and adhesion to the base material do not increase any more. Accordingly, the calcination temperature is suitably up to about 800° C. In the case of titanium oxide particles mainly comprised of brookite titanium oxide particles, the calcination is preferably performed at a temperature of 700° C. or lower so as to maintain the brookite crystal form. Especially preferably, an aqueous titanium oxide dispersion comprising chloride ion and phosphate ion, which has been prepared by hydrolyzing titanium tetrachloride in the presence of phosphate ion, can be formed into a thin film having good adhesion and high hardness by calcining the aqueous dispersion at a relatively low temperature, i.e., at least 200° C. but lower than 500° C. without incorporation of an adhesive therein.

The calcination atmosphere is not particularly limited and the calcination can be performed in an air atmosphere. The calcination time is not particularly limited and, for example, from 1 to 60 minutes. The thickness of the titanium oxide thin film with the above-described coated amount is approximately in the range of from about 0.05 µm to about 1.0 µm.

In order to firmly bond the transparent thin film of the present invention to the base material and further increase the adhesion strength thereof, an appropriate adhesive may be added to the aqueous titanium oxide dispersion. As an example of the adhesive, there can be mentioned an organic silica compound such as an alkyl silicate. The amount of the adhesive added is not particularly limited, however, in the case of alkyl silicate, the added amount thereof is, in terms of $SiO_2$, approximately from 1% to 50% by weight based on the titanium oxide in the aqueous dispersion of the present invention. If the amount of the adhesive added is smaller than 1% by weight, the effect by the addition is small. In contrast, if it exceeds 50% by weight, the adhesive strength to the base material may be very intensified but the titanium oxide particle is thoroughly coated with the adhesive and the photo-catalytic function is diminished. The adhesive may be mixed immediately before the film formation or may be previously mixed into the aqueous titanium oxide dispersion. Either process may be selected depending on the property of the adhesive. Whichever is selected, the effect of the present invention is not adversely affected. The thin film containing the adhesive may or may not be calcined.

The titanium oxide thin film prepared using the aqueous titanium oxide dispersion of the present invention is crystalline, comprises very finely divided titanium oxide particles which are free of impurities, and allows the finely divided titanium oxide particles to disperse exceedingly alike primary particles. Accordingly, the thin film has high photo-catalytic capability and high transparency. In particular, when the titanium oxide is predominantly comprised of, i.e., comprises at least 50% by weight of brookite titanium oxide, the photo-catalytic activity is more increased.

The process for producing the aqueous titanium oxide dispersion of the present invention will now be described.

It is sufficient that the aqueous titanium oxide dispersion of the present invention contains chloride ion and the Brønsted base other than chloride ion preferably in the above-described amount, and the preparation process thereof is not particularly limited. For example, a process of hydrolyzing a titanium alkoxide compound to obtain an aqueous dispersion of titanium oxide particles containing a small amount of an alcohol, adding hydrogen chloride or other chlorides thereto, and further adding thereto either one or both of nitrate ion and phosphate ion to have a concentration of the chloride ion plus nitrate and/or phosphate ion preferably falling within the above-described range may be employed. However, titanium tetrachloride which involves the generation of hydrogen chloride during the hydrolysis is preferably used. The process for producing an aqueous dispersion of titanium oxide particles will be described below by referring to the case where titanium tetrachloride is used.

The hydrogen chloride generated during the hydrolysis of titanium tetrachloride is preferably prevented from escaping out of the reaction tank and allowed to remain in the aqueous dispersion as much as possible. If the titanium tetrachloride is hydrolyzed while allowing the hydrogen chloride generated to escape, the titanium oxide in the aqueous dispersion encounters difficulties in attaining a small particle size and further, its crystallinity is deteriorated.

The hydrogen chloride generated during the hydrolysis may not be completely prevented from escaping but it is sufficient if the escaping is suppressed. The process therefor is also not particularly limited as far as the escaping can be suppressed. For example, a pressure may be applied thereto but a most simple and effective process is to perform the hydrolysis in a hydrolysis reaction vessel equipped with a reflux condenser. FIG. 1 shows this apparatus. In the figure, a reaction vessel 1 filled with an aqueous solution 2 of titanium tetrachloride is equipped with a reflux condenser 3, a stirrer 4, a thermometer 5 and a device 6 for heating the reaction vessel. During the hydrolysis reaction, water vapor and hydrogen chloride vapor are generated and most of the vapors are condensed through the reflux condenser 3 and returned to the reaction vessel 1. Accordingly, the hydrogen chloride scarcely escapes outside from the reaction vessel 1.

If the concentration of titanium tetrachloride in the aqueous titanium tetrachloride solution hydrolyzed is too low, productivity is poor and efficiency in the formation of a thin film from the aqueous titanium oxide dispersion produced is low. On the other hand, if the concentration is excessively high, the reaction vigorously proceeds, therefore, finely divided titanium oxide particles are difficult to obtain, and the dispersibility is poor and as such, the aqueous dispersion is disadvantageous as a transparent film-forming material. The titanium tetrachloride concentration is preferably in the range of from 0.05mol/liter to 10 mol/liter. By hydrolyzing this aqueous titanium tetrachloride solution underheating, a sol, i.e., an aqueous dispersion comprising titanium oxide ($TiO_2$) particles dispersed therein is obtained. When the hydrolysis is performed using a reaction vessel equipped with a reflux condenser, the aqueous dispersion obtained has titanium oxide concentration of approximately from 0.05 mol/liter to 10 mol/liter and accordingly, the thus produced aqueous dispersion can be used as it is as a coating material having a preferred titanium oxide concentration. If desired, water may be added to the aqueous dispersion as obtained by the hydrolysis or the aqueous dispersion may be concentrated, so that the titanium oxide concentration can fall within the above-described preferred range.

The hydrolysis temperature is preferably from 50° C. to the boiling point of the aqueous titanium tetrachloride solution. If the hydrolysis temperature is lower than 50° C., the hydrolysis reaction takes a long period of time. The hydrolysis is performed by elevating the temperature to a temperature within the above-described range and maintaining the temperature for approximately from 10 minutes to 12 hours. The time for maintaining the temperature may be shorter as the hydrolysis temperature is in the higher side.

The aqueous titanium tetrachloride solution may be hydrolyzed by heating a solution of titanium tetrachloride in water in a reaction vessel at a predetermined temperature, or by previously heating water in a reaction vessel, adding titanium tetrachloride therein, and then, heating the mixed solution at a predetermined temperature. The titanium oxide obtained by this hydrolysis is generally a mixture comprised of a predominant proportion of brookite titanium oxide with minor amounts of anatase titanium oxide and/or rutile titanium oxide. For obtaining titanium oxide containing a higher amount of brookite titanium oxide, a process of previously heating water in a reaction vessel at a temperature of from 75° C. to 100° C., preferably from 85° C. to 95° C., adding thereto titanium tetrachloride, and then, performing the hydrolysis at a temperature of from 75° C. to the boiling point of the solution, or, when the previous heating temperature is in the range of from 85° C. to 95° C., performing the hydrolysis at a temperature of from 85° C. to the boiling point of the solution is preferred.

By this process, titanium oxide containing at least 70% by weight of brookite titanium oxide based on the total weight of titanium oxide can be prepared. The reason for which such a high proportion of brookite titanium oxide is produced is not clearly elucidated, but it is to be noted that the titanium oxide containing a salient proportion of brookite titanium oxide is obtained from a mixture comprising chloride ion and Brønsted acid other than chloride ion by performing the hydrolysis at a temperature of from 50° C. to the boiling point of the aqueous titanium tetrachloride solution. Preferable examples of the Brønsted acid are nitric acid and phosphoric acid, which have a boiling point higher than that of hydrochloric acid.

As the temperature of the aqueous titanium tetrachloride solution to be hydrolyzed is elevated at a higher rate, the particles obtained can be finer. Accordingly, the temperature elevating rate is preferably at least 0.2° C./min, more preferably at least 0.5° C./min. By this process, titanium oxide particles in the aqueous dispersion can have a preferred average particle diameter in the range of from 0.01 μm to 0.1 μm and exhibit good crystallinity.

The type of preparation of the aqueous titanium oxide dispersion of the present invention is not limited, and a batch system may be employed, and a continuous system may also be employed wherein a continuous reaction vessel is used where titanium tetrachloride and water are continuously charged therein through an inlet, and the reaction solution is taken out from an outlet located opposite to the inlet and subsequently subjected to a dechlorination treatment.

The thus-prepared aqueous dispersion is adjusted to have a chloride ion concentration of lower than 10,000 ppm by a dechlorination treatment or by addition of water or dehydration within the range of causing no trouble.

The dechlorination treatment may be performed by generally known means and for example, electrodialysis, ion exchange resin or electrolysis may be used. To the aqueous dispersion adjusted to have a chloride ion concentration of lower than 10,000 ppm, at least one Brønsted base, preferably either one or both of nitric acid and phosphoric acid are added and the aqueous dispersion is adjusted to have a total amount of these ions of from 50 ppm to 10,000 ppm. The nitric acid, phosphoric acid and other Brønsted base may also be added at the time of hydrolysis of titanium tetrachloride.

The dispersion medium of the aqueous titanium oxide dispersion of the present invention is generally water or a mixture of water and an organic solvent. The organic solvent is added to the aqueous dispersion after the hydrolysis of titanium tetrachloride, or may be added to the aqueous titanium tetrachloride solution and the resulting solution may be hydrolyzed. Also in the case of the dispersion medium containing an organic solvent, the titanium oxide concentration in the aqueous dispersion as a coating material is preferably in the range of from 0.05 mol/liter to 10 mol/liter. In the case of adding an organic solvent after the preparation of the aqueous dispersion, the aqueous dispersion may first be concentrated or dehydrated, if desired, to increase the titanium oxide concentration and then an organic solvent may be added thereto, so that the titanium oxide concentration in the aqueous dispersion can be adjusted to fall within the above-described range.

The organic solvent is preferably hydrophilic, and specific examples thereof include monohydric or polyhydric alcohols such as methanol, ethanol and ethylene glycol, ketones such as acetone, esters such as ethyl acetate, and CELLOSOLVES such as ethyl CELLOSOLVE. These may be used either alone or as a mixture. The organic solvent may be added to the aqueous dispersion in any amount but preferably added in an amount of not larger than 2,000 parts by weight per 100 parts by weight of water in the aqueous dispersion.

In the case where a titanium oxide thin film is formed from the aqueous titanium oxide dispersion of the present invention, the aqueous dispersion as produced by the hydrolysis reaction is preferably used as it is. A process of firstly producing a titanium oxide powder from the as-produced aqueous dispersion and then dispersing the powder in water to form an aqueous titanium oxide dispersion for use is not preferred. This is because the titanium oxide particle has a high surface activity and as the particle size becomes finer and finer, the activity more increases and thus dispersion of finely divided particles into water becomes very difficult, that is, agglomerates are produced. The thin film formed from this sol has poor transparency and reduced photo-catalytic action.

The present invention will now be described in detail by referring to the following working examples, but the present invention is by no means limited to these examples.

In the working examples, the identification of the crystal structure of titanium oxide and the content of the titanium oxide having a crystal structure identified were determined as follows.

The X-ray peaks of three main crystal systems of titanium oxide, namely, brookite, anatase and rutile, are overlapped in the major part as seen in Table 1 (extract from JCPDS Card). In particular, the d values in the main peaks (intensity ratio: 100) of brookite and anatase crystals are 3.51 (crystal face: 120) and 3.52 (crystal face: 101), respectively, and 2θ by the Cu tube bulb in the X-ray diffraction is in the vicinity of 25.4°. The angle difference by 2θ is 0.1° or smaller and thus, the peaks are overlapped. Accordingly, the contents of two types of crystals cannot be determined from the intensity ratio of the main peaks thereof. The brookite also has a d value at 3.47 (crystal face: 111). 2θ in these three peaks is from 25.4° to 25.7° and thus, the peaks are substantially overlapped.

As such, the intensity ratio of the main peaks between the brookite and the anatase cannot be obtained. In the working examples, the peak of the 121 face of the brookite, which is not overlapped with the peak of the anatase, was used and an intensity ratio of this peak to the peak where the above-described three peaks are overlapped (peak intensity of 121 face of brookite)/(peak intensity where three peaks are overlapped) was obtained. From the intensity ratio obtained, the contents of brookite titanium oxide and anatase titanium oxide were determined. The content of the rutile titanium oxide was determined from an intensity ratio of the main peak (110 face) of the rutile type titanium oxide to the peak where three peaks are overlapped (main peak intensity of rutile)/(peak intensity where three peaks are overlapped). In actual measurement, identification by the X ray diffraction using an X ray diffraction apparatus (RAD-B Rotor Flex, supplied by Rigaku Denki KK) and quantitative analysis by a data processing were performed together.

In the working examples, the following physical properties of a thin film were evaluated as characteristics of an aqueous titanium oxide dispersion.

Evaluation of Properties of Thin Film 2 ml of the coating solution prepared in each of Examples and Comparative Examples was coated on a soda lime glass having a size of 76 mm×26 mm. The glass was kept perpendicularly for 10 minutes to remove the excess coating solution. After the completion of coating, the glass with the coating solution was dried and calcined at a predetermined temperature described in each of Examples and Comparative Examples (hereinafter referred to as "film-forming temperature" which means a calcination temperature) to obtain a titanium oxide thin film (film thickness: about 0.2 μm). Transparency, photo-catalytic activity, tight adhesion, adhesive strength and pencil hardness of the thin film formed was evaluated. The results obtained are shown in Table 3.

Transparency

The transparency was determined according to JIS K6718 using a haze meter, manufactured by Tokyo Denshoku Gijutsu Center KK, and evaluated according to the following three ratings.

A: Haze ratio of smaller than 2.0%

B: Haze ratio of at least 2.0% but smaller than 5.0%

C: Haze ratio of at least 5%

Photo-catalytic Activity

The Photo-catalytic activity was determined by coating a few drops of red ink on the base material, irradiating the coating with black light (365 nm) at an ultraviolet intensity of 2.1 mW/cm$^2$ for 30 minutes, and observing the fading of the red ink by the naked eye. The results were expressed according to the following three ratings.

A: Well discolored

B: Partially not discolored

C: Not discolored

Tight Adhesion

The tight adhesion to the base material was evaluated by a water wiping test and an alcohol wiping test. The soda lime glass base material was rubbed in 10 reciprocation motions with KIMWIPE™ (produced by Crecia) wetted with water or an alcohol and then wiped off with dry KIMWIPE™ in 10 reciprocation motions. Thereafter, the film state was evaluated by the naked eye and expressed by the following three ratings.

A: The film was not scratched.

B. The film was partially scratched.

C. The film was partially stripped off.

Adhesive Strength

The adhesive strength was determined by a cross-cut tape adhesion test according to JIS K5400, where the scratch interval was 1 mm and the number of squares was 100. The adhesive strength was expressed by the number of squares among 100 squares, which were not peeled.

Pencil Hardness

TABLE 1

Extract of JCPDS Card (Card No.)

| Brookite (29-1360) | | | Anatase (21-1272) | | | Rutile (21-1276) | | |
| --- | --- | --- | --- | --- | --- | --- | --- | --- |
| d Value | Crystal face | Intensity ratio | d Value | Crystal face | Intensity ratio | d Value | Crystal face | Intensity ratio |
| 3.51 | 120 | 100 | 3.52 | 101 | 100 | 3.25 | 110 | 100 |
| 2.90 | 121 | 90 | 1.89 | 200 | 35 | 1.69 | 211 | 60 |
| 3.47 | 111 | 80 | 2.38 | 004 | 20 | 2.49 | 101 | 50 |

EXAMPLE 1

To titanium tetrachloride (purity: 99.9%), water was added to prepare an aqueous titanium tetrachloride solution having a concentration of 0.25 mol/liter (2% by weight as titanium oxide). At this time, the system was ice cooled so that the liquid temperature of the aqueous solution did not exceed 50° C. Thereafter, 1 liter of this aqueous solution was charged into a reaction vessel with a reflux condenser as shown in FIG. 1 and heated to a temperature (104° C.) in the vicinity of the boiling point. The mixed solution was kept at the same temperature for 60 hours to effect hydrolysis. The thus-obtained aqueous dispersion was cooled and the residual chlorine produced by the reaction was removed by electrodialysis to have a chloride ion (Cl ion) concentration of 1,000 ppm. The electrodialysis was performed by an electrodialyser Model G3 manufactured by Asahi Chemical Industry Co., Ltd. while monitoring the pH of the aqueous dispersion. Then, nitric acid was added to the aqueous dispersion to have a $NO_3$ ion concentration of 3,000 ppm.

To the aqueous titanium oxide dispersion adjusted to have the above-described chloride ion and nitrate ion concentrations, a water-soluble polymer polyvinyl alcohol as a thin film formation aid was added in an amount of 1,000 ppm based on the weight of the aqueous dispersion. Even after one or more days, precipitation of finely divided titanium oxide particles produced was not observed in the aqueous dispersion.

A part of particles in the aqueous dispersion were sampled, and observation of the particles through a transmission type electron microscope revealed that the average particle diameter was 0.018 μm. Thereafter, the crystal structure of the titanium oxide was examined by X ray diffraction. As a result, the X ray peak intensity ratio (peak intensity of 121 face of brookite/peak intensity where three peaks are overlapped) was 0.35 and there was not observed a peak of rutile type. The titanium oxide obtained was crystalline, and from the peak intensity ratio determined, it was proved to consist of about 40% by weight of anatase titanium oxide and about 60% by weight of brookite titanium oxide.

Then, an ethanol solution of tetraethyl-o-silicate (concentration: 0.25% by weight as $SiO_2$) as an adhesive was prepared.

The aqueous dispersion obtained above was mixed together with this adhesive solution at a weight ratio of 1:1 to prepare a coating material of the aqueous titanium oxide dispersion. This coating material had a composition shown in Table 2. According the above-described method, thin film was formed from the coating material and its properties were evaluated wherein the heating temperature of the coating was 100° C. The evaluation results are shown in Table 3.

EXAMPLE 2

By the same procedures as described in Example 1, an aqueous titanium oxide dispersion was prepared and thin film was formed from the aqueous dispersion and evaluated. The composition of the coating material and the process for preparation thereof were identical to those employed in Example 1, but the heating (calcination) temperature was varied to 400° C. The composition of the coating material is shown in Table 2 and the evaluation results of the thin film are shown in Table 3.

Comparative Examples 1 to 4

By the same procedures as described in Example 1, an aqueous titanium oxide dispersion was prepared and thin film was formed from the aqueous dispersion and evaluated. Nitric acid was not added and the amount of chloride ion was varied as shown in Table 3. Tetraethyl ortho-silicate as an adhesive was not added in Comparative Examples 1 and 2. The composition of the coating materials are shown in Table 2 and the evaluation results of the thin films are shown in Table 3.

EXAMPLES 3 to 12

By the same procedures as described in Example 1, aqueous titanium oxide dispersions were prepared, and thin films were formed therefrom and properties thereof were evaluated. The amounts of phosphate ion and nitrate ion were varied. The compositions of the coating materials are shown in Table 2, and the evaluation results are shown in Table 3.

Particle sizes and crystal forms of titanium oxide particles obtained in Comparative Examples 1 and 2 and Examples 3 to 12 were almost the same as those of Examples 1 and 2.

EXAMPLE 13

954 ml of distilled water was charged in a reaction vessel with a reflux condenser as shown in FIG. 1 and heated at 95° C. Then, phosphoric acid was added to have a concentration as $PO_4$ of 200 ppm. To this aqueous solution in the reaction vessel, 46 ml of an aqueous titanium tetrachloride solution (Ti content: 16.3% by weight, specific gravity: 1.59, purity: 99.9% by weight) was added dropwise at a rate of about 5 ml/min while keeping the stirring rate at about 200 rpm. At this time, the dropwise addition was carefully made so as not to lower the temperature of the reaction solution. As a result, the titanium tetrachloride concentration was 0.25 mol/liter (2% by weight as titanium oxide).

In the reaction vessel, the reaction solution started to become turbid white immediately after the dropwise addition but the temperature was kept as it was, and after the completion of dropwise addition, the temperature was further elevated near to the boiling point (104° C.). The reaction solution was held in this state for 60 minutes to complete the reaction. After the cooling, the residual chlorine produced by the reaction was removed by electrodialysis to adjust the pH to 1.9 (chloride ion: 600 ppm, phosphate ion: 200 ppm). Thereafter, a water-soluble polymer polyvinyl alcohol as a thin film formation aid was added in an amount of 0.1% by weight based on the titanium oxide content to prepare an aqueous dispersion of titanium oxide ($TiO_2$:about 0.25 mol/liter). This aqueous dispersion was stable and eve n after 30 or more days, precipitation of finely divided titanium oxide particles produced was not observed.

A part of the aqueous titanium oxide dispersion obtained above was filtered, formed into a powder by a vacuum drier at 60° C. and taken out, and the powder was subjected to quantitative analysis in the same manner as in the previous working examples. As a result, the ratio of (peak intensity of 121 face of brookite/peak intensity where three peaks are overlapped) was 0.38 and the ratio of (main peak intensity of rutile/peak intensity where three peaks are overlapped) was 0.05. From these, it was determined that the titanium oxide was crystalline, and consisted of about 70.0% by weight of brookite, about 1.2% by weight of rutile and about 28.8% by weight of anatase. Observation of the finely divided particles through a transmission type electron microscope revealed that the primary particles had an average particle diameter of 0.015 μm. Further, the finely divided particles had a specific surface area of 140 $m^2/g$ as determined by the BET method.

A thin film was made and properties thereof were evaluated in the same manner as in the previous examples. The composition of the coating, material is shown in Table 2, and the evaluation results are shown in Table 3.

EXAMPLE 14

Hydrolysis of titanium tetrachloride was performed under the same hydrolysis conditions as in Example 1 to obtain an aqueous dispersion containing 0.25 mol/liter of finely divided titanium oxide particles. Before performing electrodialysis, the aqueous dispersion was concentrated by evaporation to have a titanium oxide concentration of 2.5 mol/liter (20% by weight as titanium oxide). Thereafter, the residual chlorine was removed by electrodialysis to have a chloride ion concentration of about 1,200 ppm.

Subsequently, nitric acid and phosphoric acid were added to the aqueous dispersion to have a concentration of 2,000 ppm as $NO_3$ ion and 1,000 ppm as $PO_4$ ion, respectively. To the resulting aqueous titanium oxide dispersion adjusted to contain nitrate ion and phosphate ion as described above, methyl alcohol as a solvent and a water-soluble polymer polyvinyl alcohol were added in amounts shown in Table 2, thereby obtaining an aqueous titanium oxide dispersion ($TiO_2$:about 0.5 mol/liter).

Using this aqueous dispersion, a thin film was formed in the same manner as above and properties of the thin film were evaluated. The evaluation results are shown in Table 3.

The average particle diameter, the ratio among crystal forms and the specific surface area of titanium oxide particles were almost the same as those in Examples 1 and 2.

TABLE 2

Composition of Coating Material

| Examples and Comparative Examples | Water (wt %) | Ethanol*$_1$ or Methanol*$_2$ (wt %) | Polyvinyl alcohol (wt %) | Tetraethyl-o-silicate (wt % as $SiO_2$) | Chloride ion (Cl) (wt ppm) | Nitrate ion ($NO_3$) (wt ppm) | Phosphate ion ($PO_4$) (wt ppm) | Titanium oxide ($TiO_2$) (mol/l) |
|---|---|---|---|---|---|---|---|---|
| Example 1 | 49 | 49*$_1$ | 0.1 | 0.125 | 500 | 1500 | — | 0.125 |
| Example 2 | 49 | 49*$_1$ | 0.1 | 0.125 | 500 | 1500 | — | 0.125 |
| Example 3 | 49 | 49*$_1$ | 0.1 | 0.125 | 1000 | — | 200 | 0.125 |
| Example 4 | 49 | 49*$_1$ | 0.1 | 0.125 | 1000 | — | 200 | 0.125 |
| Example 5 | 49 | 49*$_1$ | 0.1 | 0.125 | 100 | 50 | — | 0.125 |
| Example 6 | 49 | 49*$_1$ | 0.1 | 0.125 | 100 | 50 | — | 0.125 |
| Example 7 | 49 | 49*$_1$ | 0.1 | 0.125 | 2000 | — | 100 | 0.125 |
| Example 8 | 49 | 49*$_1$ | 0.1 | 0.125 | 2000 | — | 100 | 0.125 |
| Example 9 | 49 | 49*$_1$ | 0.1 | 0.125 | 1000 | 1000 | 100 | 0.125 |
| Example 10 | 49 | 49*$_1$ | 0.1 | 0.125 | 1000 | 1000 | 100 | 0.125 |
| Example 11 | 49 | 49*$_1$ | 0.1 | 0.125 | 1500 | 1000 | 500 | 0.125 |
| Example 12 | 49 | 49*$_1$ | 0.1 | 0.125 | 1500 | 1000 | 500 | 0.125 |
| Example 13 | 98 | — | 0.1 | — | 600 | — | 200 | 0.25 |
| Example 14 | 49 | 49*$_2$ | 0.1 | — | 600 | 1000 | 600 | 0.125 |
| Com. Ex. 1 | 49 | 49*$_1$ | 0.1 | — | 1000 | — | — | 0.125 |
| Com. Ex. 2 | 49 | 49*$_1$ | 0.1 | — | 1000 | — | — | 0.125 |
| Com. Ex. 3 | 49 | 49*$_1$ | 0.1 | 0.125 | 1000 | — | — | 0.125 |
| Com. Ex. 4 | 49 | 49*$_1$ | 0.1 | 0.125 | 1000 | — | — | 0.125 |

TABLE 3

Evaluation of Thin Film

| Examples and Comparative Examples | Film-forming temperature (° C.) | Transparency | Photo-catalytic activity | Tight adhesion, water*1 | Tight adhesion, alcohol*2 | Adhesive strength *3 | Pencil hardness |
|---|---|---|---|---|---|---|---|
| Example 1 | 100 | A | A | A | B | 90 | 4H |
| Example 2 | 400 | A | B | A | A | 90 | 4H |
| Example 3 | 100 | B | A | A | B | 90 | 4H |
| Example 4 | 400 | B | A | A | A | 90 | 4H |
| Example 5 | 100 | A | A | A | B | 90 | 4H |
| Example 6 | 400 | A | B | A | A | 90 | 4H |
| Example 7 | 100 | B | A | A | B | 95 | 4H |
| Example 8 | 400 | B | A | A | A | 95 | 5H |
| Example 9 | 100 | A | A | A | B | 95 | 4H |
| Example 10 | 400 | A | A | A | A | 95 | 5H |
| Example 11 | 100 | A | A | A | B | 95 | 4H |
| Example 12 | 400 | A | A | A | A | 95 | 5H |
| Example 13 | 400 | A | A | A | A | 100 | 7H |
| Example 14 | 400 | A | A | A | A | 100 | 7H |
| Com. Ex. 1 | 100 | B | A | C | C | 80 | HB |
| Com. Ex. 2 | 400 | B | B | B | C | 85 | 2H |
| Com. Ex. 3 | 100 | B | A | B | C | 85 | 2H |
| Com. Ex. 4 | 400 | B | B | B | C | 85 | 2H |

*1Water wiping test,
*2Alcohol wiping test,
*3Number of squares not stripped/100 squares

INDUSTRIAL APPLICABILITY

The aqueous dispersion of titanium oxide particles of the present invention comprises chloride ion and at least one kind of Brønsted base other than chloride ion. When the aqueous dispersion of titanium oxide of the present invention is coated on a base material of various types to form a titanium oxide thin film, the thin film is transparent and exhibits excellent photo-catalytic activity. Especially, in the case of brookite titanium oxide, a strong photo-catalytic activity is obtained. Furthermore, the thin film has high hardness and exhibits excellent adhesion to the base material.

Accordingly, the thin film on the base material has good durability and, when this thin film is formed on a glass tube or cover of lighting equipment, the photocatalytic activity can be maintained over a long period of time without shielding the light.

The aqueous dispersion of titanium oxide particles of the present invention can be prepared in an aqueous system starting from titanium tetrachloride and is advantageous in that the starting material is inexpensive, the aqueous dispersion can be easily formed into a thin film in an economically advantageous manner.

A thin film formed from an aqueous brookite titanium oxide dispersion containing nitrate ion has an especially high transparency. An aqueous titanium oxide dispersion containing phosphate ion is advantageous in that, when a thin film formed therefrom on a soda glass base material is calcined, deterioration of photocatalytic activity due to calcination can be prevented or minimized, and thus, a high photocatalytic activity can be obtained.

What is claimed is:

1. An aqueous dispersion of titanium oxide particles comprising chloride ion and at least one Brønsted base selected from the group consisting of pyrophosphate ion, metaphosphate ion, polyphosphate ion, methanesulfonate ion, ethanesulfonate ion, dodecylbenzenesulfonate ion and propanesulfonate ion, wherein the titanium oxide particles have an average particle diameter of from about 0.01 µm to about 0.1 µm.

2. The aqueous titanium oxide dispersion as claimed in claim 1, wherein the content of chloride ion and the Brønsted base is in the range of about 50 ppm to about 10,000 ppm as the total anion content in the aqueous titanium oxide dispersion.

3. The aqueous titanium oxide dispersion as claimed in claim 1, wherein the content of titanium oxide particles in the aqueous titanium oxide dispersion is in the range of about 0.05 mol/liter to about 10 mol/liter.

4. The aqueous titanium oxide dispersion as claimed in claim 1, which further contains from about 10 ppm to about 10,000 ppm of a water-soluble polymer.

5. The aqueous dispersion of titanium oxide particles as claimed in claim 1, wherein the Brønsted base is selected from the group consisting of metaphosphate ion, methanesulfonate ion, ethanesulfonate ion, dodecylbenzenesulfonate ion and propanesulfonate ion.

6. The aqueous titanium oxide dispersion as claimed in claim 1, which further contains an adhesive.

7. The aqueous titanium oxide dispersion as claimed in claim 6, wherein the adhesive is an alkyl silicate.

8. An article made by coating a surface of a base material with the aqueous dispersion of titanium oxide particles as claimed in claim 1.

9. The article as claimed in claim 8, wherein the base material is made of at least one substance selected from the group consisting of ceramics, metals, glass, plastics, paper and wood.

10. A titanium oxide thin film formed on a surface of a base material with the aqueous dispersion of titanium oxide particles as claimed in claim 1.

11. The titanium oxide thin film as claimed in claim 10, wherein the base material is made of at least one substance selected from the group consisting of ceramics, metals, glass, plastics, paper and wood.

12. The titanium oxide thin film as claimed in claim 10, wherein the base material is made of at least one heat-resistant substance selected from the group consisting of ceramics, metals and, glass, and the titanium oxide thin film has been calcined.

13. An aqueous titanium oxide dispersion comprising chloride ion and a Brønsted base selected from the group consisting of nitrate ion, phosphate ion, pyrophosphate ion, metaphosphate ion, polyphosphate ion and an organic acid ion, which is a dispersion of titanium oxide particles comprising at least 70% by weight of brookite titanium oxide particles having an average particle diameter of from about 0.01 µm to about 0.1 µm and a specific surface area of at least about 20 m²/g.

14. The aqueous titanium oxide dispersion as claimed in claim 13, wherein Brønsted base is at least one ion selected from the group consisting of nitrate ion and phosphate ion.

15. The aqueous titanium oxide dispersion as claimed in claim 13, wherein the content of titanium oxide particles in the aqueous titanium oxide dispersion is in the range of about 0.05 mol/liter to about 10 mol/liter.

16. The aqueous titanium oxide dispersion as claimed in claim 13, which further contains from about 10 ppm to about 10,000 ppm of a water-soluble polymer.

17. The aqueous titanium oxide dispersion as claimed in claim 13, which further contains an adhesive.

18. An article made by coating a surface of a base material with the aqueous dispersion of titanium oxide particles as claimed in claim 13.

19. A titanium oxide thin film formed on a surface of a base material with the aqueous dispersion of titanium oxide particles as claimed in claim 13.

20. The titanium oxide thin film as claimed in claim 19, wherein the base material is made of at least one substance selected from the group consisting of ceramics, metals, glass, plastics, paper and wood.

21. An aqueous dispersion of titanium oxide particles containing chloride ion and a Brønsted base selected from the group consisting of nitrate ion, phosphate ions, pyrophosphate ion, metaphosphate ion, polyphosphate ion and an organic acid ion, and further containing a binder comprising an alkyl silicate.

22. A process for producing an aqueous dispersion of titanium oxide particles comprising chloride ion and at least one Brønsted base other than chloride ion, characterized in that titanium tetrachloride is hydrolyzed in the presence of a solution containing at least one Brønsted base from the group consisting of nitrate ion, phosphate ion, pyrophosphate ion, metaphosphate ion, polyphosphate ion, methanesulfonate ion, ethanesulfonate ion, dodecylbenzenesulfonate ion and propanesulfonate ion.

23. The process for producing the aqueous titanium oxide dispersion as claimed in claim 22, wherein the content of chloride ion and the Brønsted base is made to fall in the range of about 50 ppm to about 10,000 ppm as the total anion content in the aqueous titanium oxide dispersion.

24. The process for producing the aqueous dispersion of titanium oxide particles as claimed in claim 22, wherein the hydrolysis of titanium tetrachloride is carried out in a reaction vessel equipped with a reflux condenser.

25. A process for producing titanium oxide particles characterized by obtaining the titanium oxide particles from the aqueous titanium oxide dispersion prepared by the process as claimed in claim 22.

26. A process for producing an aqueous dispersion of titanium oxide particles, characterized in that titanium tetrachloride is hydrolyzed in the presence of a solution comprising a Brønsted base, which is at least one ion selected from the group consisting of nitrate ion and phosphate ion; and the content of chloride ion and the Brønsted base is made to fall in the range of about 50 ppm to about 10,000 ppm as the total anion content in the aqueous titanium oxide dispersion.

27. A process for producing titanium oxide particles characterized by obtaining the titanium oxide particles from the aqueous titanium oxide dispersion prepared by the process as claimed in claim 26.

28. A process for producing an aqueous dispersion of titanium oxide particles comprising brookite titanium oxide particles, which comprises chloride ion and a Brønsted base other than chloride ion, characterized in that titanium tetrachloride is hydrolyzed in the presence of a solution containing at least one Brønsted base selected from the group consisting of nitrate ion, phosphate ion, pyrophosphate ion, metaphosphate ion, polyphosphate ion, methanesulfonate ion, ethanesulfonate ion, dodecylbenzenesulfonate ion and propanesulfonate ion.

29. The process for producing the aqueous brookite titanium oxide dispersion as claimed in claim 28, wherein the content of chloride ion and the Brønsted base other than chloride ion is made to fall in the range of about 50 ppm to about 10,000 ppm as the total anion content in the aqueous brookite titanium oxide dispersion.

30. The process for producing the aqueous dispersion of titanium oxide particles as claimed in claim 29, wherein the hydrolysis of titanium tetrachloride is carried out in a reaction vessel equipped with a reflux condenser.

31. A process for producing finely divided brookite titanium oxide particles, characterized by obtaining the titanium oxide particles from the aqueous brookite titanium oxide dispersion prepared by the process as claimed in claim 29.

32. A process for producing an aqueous dispersion of titanium oxide particles predominantly comprised of brookite titanium oxide particles, which comprises chloride ion and at least one ion selected from the group consisting of nitrate ion and phosphate ion, characterized in that titanium tetrachloride is hydrolyzed in the presence of at least one ion selected from the group consisting of nitrate ion and phosphate ion at a temperature in the range from about 75° C. to the boiling point of an aqueous reaction solution.

33. The process for producing the aqueous dispersion of titanium oxide particles Predominantly comprised of brookite titanium oxide particles, as claimed in claim 32 wherein the content of chloride ion and at least one kind of ion selected from the group consisting of nitrate ion and phosphate ion is made to fall in the range of about 50 ppm to about 10,000 ppm as the total anion content in the aqueous brookite titanium oxide dispersion.

34. The process for producing the aqueous dispersion of titanium oxide particles as claimed in claim 32, wherein the hydrolysis of titanium tetrachloride is carried out in a reaction vessel equipped with a reflux condenser.

35. A process for producing titanium oxide particles, characterized by obtaining titanium oxide particles predominantly comprised of brookite titanium oxide particles, from the aqueous titanium oxide dispersion prepared by the process as claimed in claim 32.

\* \* \* \* \*